US012704374B2

(12) United States Patent
Rakotovao Andriamahefa

(10) Patent No.: US 12,704,374 B2
(45) Date of Patent: Aug. 11, 2026

(54) METHOD FOR CHARACTERIZING THE ENVIRONMENT OF A MOBILE DEVICE, PRODUCING A STATIC SPACE GRID AND/OR A FREE SPACE GRID

(71) Applicant: COMMISSARIAT A L'ENERGIE ATOMIQUE ET AUX ENERGIES ALTERNATIVES, Paris (FR)

(72) Inventor: Tiana Rakotovao Andriamahefa, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 439 days.

(21) Appl. No.: 18/542,311

(22) Filed: Dec. 15, 2023

(65) Prior Publication Data

US 2024/0200946 A1 Jun. 20, 2024

(30) Foreign Application Priority Data

Dec. 16, 2022 (FR) ....................................... 2213671

(51) Int. Cl.
*G01S 17/93* (2020.01)
*G01C 21/00* (2006.01)
(Continued)

(52) U.S. Cl.
CPC ............ *G01C 21/005* (2013.01); *G01S 13/08* (2013.01); *G01S 13/88* (2013.01); *G01S 13/89* (2013.01);
(Continued)

(58) Field of Classification Search
CPC ....... G01C 21/005; G01S 13/89; G01S 15/89; G01S 13/881; G01S 13/931;
(Continued)

(56) References Cited

U.S. PATENT DOCUMENTS

2020/0193686 A1* 6/2020 Chong ...................... G06T 7/70
2021/0131823 A1 5/2021 Giorgio et al.
2022/0185294 A1 6/2022 Rakotovao Andriamahefa

FOREIGN PATENT DOCUMENTS

FR 3041451 A1 3/2017
FR 3116640 A1 5/2022

OTHER PUBLICATIONS

Nuss, et al., "A Random Finite Set Approach for Dynamic Occupancy Grid Maps with Real-Time Application", The International Journal of Robotics Research, vol. 37(8), pp. 841-866, 2018.

(Continued)

*Primary Examiner* — Rodney A Butler
(74) *Attorney, Agent, or Firm* — BakerHostetler

(57) ABSTRACT

A method for characterizing the environment of a mobile device, wherein, for each iteration at a time t, the following steps are implemented: S10) Acquiring a plurality of distance measurements ($z_t$) in the environment by way of at least one sensor; S20) Generating a pair ($w_t$) of occupancy grids at the time t−1 ($OG_{t-1}$) and at the time ($OG_t$), each grid ($OG_{t-1}$, $OG_t$) fusing the distance measurements into a discretized spatial representation of the environment; S30) Generating a static space grid at the time ($SG_t$), Or S40) Generating a free space grid at the time ($FG_t$).

15 Claims, 3 Drawing Sheets

(51) Int. Cl.

| | |
|---|---|
| ***G01S 13/08*** | (2006.01) |
| ***G01S 13/88*** | (2006.01) |
| ***G01S 13/89*** | (2006.01) |
| ***G01S 13/93*** | (2020.01) |
| ***G01S 15/89*** | (2006.01) |
| ***G01S 15/93*** | (2020.01) |
| *G01S 13/931* | (2020.01) |
| *G05D 1/246* | (2024.01) |
| *G05D 109/10* | (2024.01) |

(52) U.S. Cl.
CPC .............. *G01S 13/93* (2013.01); *G01S 15/89* (2013.01); *G01S 15/93* (2013.01); *G01S 17/93* (2013.01); *G01S 2013/9323* (2020.01); *G01S 2013/9324* (2020.01); *G05D 1/2464* (2024.01); *G05D 2109/10* (2024.01)

(58) Field of Classification Search
CPC ........... G01S 15/931; G01S 2013/9323; G01S 2013/9324; G01S 17/931; G01S 13/08; G05D 2109/10; G05D 1/2464
See application file for complete search history.

(56) References Cited

OTHER PUBLICATIONS

Moravec, et al., “High resolution maps from wide angle sonar”, Proceedings. 1985 IEEE International Conference on Robotics and Automation, IEEE Icra, vol. 2, pp. 116-121, Mar. 1985.

Coue, et al., “Bayesian Occupancy Filtering for Multitarget Tracking: an Automotive Application”, The International Journal of Robotics Research, vol. 25, Issue 1, 2006.

* cited by examiner

METHOD FOR CHARACTERIZING THE ENVIRONMENT OF A MOBILE DEVICE, PRODUCING A STATIC SPACE GRID AND/OR A FREE SPACE GRID

CROSS-REFERENCE TO RELATED APPLICATION

This application claims priority to foreign French patent application No. FR 2213671, filed on Dec. 16, 2022, the disclosure of which is incorporated by reference in its entirety.

FIELD OF THE INVENTION

The invention relates to a method for characterizing the environment of a mobile device (also called a robot hereinafter) using distance sensors. It also relates to a device for implementing such a method.

BACKGROUND

The invention may be applied to any type of robot, for example ground robots (autonomous cars), aerial robots (drones), underwater robots, etc.

A mobile robot navigates through space to carry out a task. To navigate autonomously, the robot has to acquire knowledge about its environment in order to plan a path, avoid collisions and navigate safely. For this purpose, the robot relies on a perception system.

The perception system retrieves data about the environment through measurements from on-board sensors. A computer model of the environment is then constructed and updated continuously by the perception system based on measurements from sensors. The robot will reason and make navigation decisions based on the environment model.

Many types of environment model exist in the prior art. One of the most commonly used in robotics is the occupancy grid, initially introduced in the article by H. P. Moravec and A. Elfes "High resolution maps from wide angle sonar", Proceedings. IEEE ICRA, volume 2, pages 116-121, March 1985. The occupancy grid is a probability grid: each cell has a probability of occupancy, and therefore a value between 0 and 1.

An occupancy grid is a map of a delimited region of the environment surrounding the robot. The region is subdivided into multiple adjacent sub-regions, called cells.

A cell may have three dimensions (3D), for example a cube of 10 cm×10 cm×10 cm. It may also be two-dimensional (2D), for example the space delimited by a square of 10 cm×10 cm. The collection of all of the cells forms a grid.

The objective of the framework defined by the occupancy grid is to compute the probability of a cell being occupied by an obstacle, given the measurements from the on-board sensors. A probability of occupancy of 1 means "the cell is occupied", 0 means "the cell is free", and a value between 0 and 1 expresses the uncertainty regarding the occupancy of the cell. In particular, a probability of occupancy of ½ means that the occupancy of the cell is unknown, that is to say that the cell may be free or occupied, without leaning towards one of the two hypotheses.

Occupancy grids have advantageous properties for a perception system. They constitute a robust method for fusing multiple sensors of various technologies. Patent application FR3041451 provides one example of a multi-sensor fusion method employing integer arithmetic computations.

Commonly used detection technologies are lidars, radars, cameras and sonars. While cameras give detailed colours and textures, they are limited in darkness. Lidars are able to give a detailed representation of point clouds, but their performance decreases in bad weather (snow, fog or rain).

Multi-sensor fusion is therefore essential for overcoming the limitation of a given technology. Occupancy grids also make it possible to manage measurement uncertainties and noise through probabilistic approaches.

Feature grids thus represent free space and the space occupied by one or more tangible bodies. The term "tangible bodies" (or obstacle) denotes any tangible substance or object having individuality and able to be detected and identified by an appropriate sensor.

Inanimate objects, whether natural or artificial, plants, animals, human beings, but also liquid or solid particles suspended in the air, such as clouds, or even liquid or gaseous masses, are thus considered to be tangible bodies.

For example, for an autonomous car, common tangible bodies are pedestrians, other cars, buildings, vegetation, cyclists, etc. The tangible bodies may be mobile, that is to say dynamic, or static. The occupancy state of a cell may vary over time. Indeed, a cell may be free for a certain time, and then suddenly occupied by a moving obstacle, and then free again when the obstacle has left. For example, a pedestrian may stand up without moving for a short period and then walk in one direction.

The standard framework of the feature grids computes the probabilities of occupancy of all of the cells of a grid in each iteration t, taking into account only the instantaneous measurements from the sensors in the same iteration. Let $OG_t$ be the feature grid constructed in iteration t (or at the time t). Let us consider a cell c that has always been estimated as being free by all of the feature grids from $OG_1$ to $OG_{t-1}$.

In iteration t, let us assume that the cell is temporarily hidden from the sensors by a moving obstacle. The occlusion causes the occupancy state of the cell c to suddenly change from free to unknown in iteration t. This means that the previous estimates have been abruptly forgotten, even though it is possible that the cell c remains free in iteration t while it is temporarily occluded.

The same effect appears for static cells, that is to say cells occupied by fixed obstacles. These cells are estimated as being occupied as long as they are present in the field of view of the sensors. However, their occupancy state suddenly becomes unknown as soon as they are obstructed by an obstacle, even in motion. However, since they are occupied by a static tangible body (an obstacle), it is possible that these cells remain occupied during the occlusion.

Many approaches exist in the prior art for taking into account the history of measurements in order to estimate free cells and cells occupied by a static tangible body.

The most promising approaches consist in using particle filters to separate cells occupied by dynamic obstacles from cells occupied by static obstacles.

Particle filters are described for example in the article by Nuss, D., Reuter, S., Thom, M., Yuan, T., Krehl, G., Maile, M., Dietmayer, K. (2018) "A random finite set approach for dynamic occupancy grid maps with real-time application", The International Journal of Robotics Research, 37(8), 841-866. The definition of a particle in these algorithms may differ but, in general, particles are a set of points distributed in space. Particles have position coordinates and a velocity vector.

A particle also has a weight used to estimate velocity distributions. Between successive iterations, a particle moves at its velocity (modulo the introduction of a random error).

The basic idea of these algorithms is to randomly spread particles in space such that their movement follows the movement of dynamic tangible bodies. The particles are distributed within the grid such that a large number of particles are present in the cells occupied by dynamic tangible bodies.

These approaches simultaneously estimate where the free cells are, where the static ones are and where the dynamic ones are, leading to a solution with a high computing burden. These approaches therefore require high-performance computing hardware such as GPUs (Graphics Processing Units) to achieve real-time execution, thereby hampering integration thereof into embedded hardware having more limited computing performance and lower energy consumption, such as microcontrollers.

SUMMARY OF THE INVENTION

The invention therefore aims to provide a method that takes into account the history of measurements in order to estimate free cells and cells occupied by a static tangible body, and which may be integrated into embedded microcontroller hardware.

One subject of the invention is therefore a method for characterizing the environment of a mobile device, wherein, for each iteration at a time t, the following steps are implemented:

S10) Acquiring a plurality of distance measurements in the environment by way of at least one sensor;

S20) Generating a pair of occupancy grids at the time t−1 and at the time, each grid fusing the distance measurements into a discretized spatial representation of the environment;

S30) Generating a static space grid at the time $SG_t$, each cell of the static space grid at the time t having a subsequent probability of said cell being occupied by a static tangible body at the time t, said subsequent probability being computed for each cell by way of a binary Bayesian filter from:

the subsequent probability of said cell being occupied by a static tangible body at the time t−1, said subsequent probability of said cell being occupied by a static tangible body at the time t−1 being injected directly at input of the binary Bayesian filter; what is referred to as a static prediction model comprising a probability of the cell being occupied by a static tangible body at the time t as a function of the state of the cell at the time t−1; and what is referred to as a static inverse model at the time t that comprises a probability of knowing that the cell is occupied by a static tangible body at the time t from the pair of occupancy grids at the time t−1 and at the time t;

or

S40) Generating a free space grid at the time, each cell of the free space grid at the time t having a subsequent probability of said cell being free at the time t, said subsequent probability being computed for each cell by way of a binary Bayesian filter from:

the subsequent probability of said cell being free at the time t−1, said subsequent probability of said cell being free at the time t−1 being injected directly at input of the binary Bayesian filter;

what is referred to as a free prediction model comprising a probability of the cell being free at the time t as a function of the state of the cell at the time t−1; and what is referred to as a free inverse model at the time t that comprises a probability of knowing that the cell is free at the time t from the pair of occupancy grids at the time t−1 and at the time t.

Advantageously, step S30) of generating a static space grid and step S40) of generating a free space grid are implemented concomitantly.

Advantageously, the method comprises a step S50) of generating a combined grid resulting from the combination of the static space grid and the free space grid.

Advantageously, each cell i of the combined grid is computed by way of the following Bayesian fusion:

$$CG_t(i) \triangleq F(SG_t(i), 1 - FG_t(i))$$

Wherein F(,) is the Bayesian fusion function, $CG_t(i)$ corresponds to a cell i of the combined grid at the time t, $SG_t(i)$ corresponds to a cell i of the static space grid at the time t, and $FG_t(i)$ corresponds to a cell i of the free space grid at the time t, And according to the value of $CG_t(i)$:

if $CG_t(i)>½$, the cell i is probably static given the sequence of pairs of occupancy grids if $CG_t(i)<½$, the cell is probably free, if $CG_t(i)=½$, the cell is neither free nor static.

Advantageously:

the subsequent probability of the cell being occupied by a static tangible body at the time t and the static inverse model at the time t are approximated by values belonging to a set of finite cardinality, the values being identified respectively by a probability index $n(s_t|w_{1:t})$ and by a static inverse model index $n(s_t|w_t)$;

the subsequent probability of the cell being free at the time t and the free inverse model at the time t are approximated by values belonging to a set of finite cardinality, the values being identified respectively by a probability index $n(f_t|w_{1:t})$ and by a free inverse model index $n(f_t|w_t)$.

Advantageously, the static inverse model index $n(s_t|w_t)$ is computed as follows:

$$n(s_t|w_t) = \begin{cases} g(w_t) > 0 & \text{if } n(o_{i,t-1}|z_{t-1}) > 0 \text{ and } n(o_{i,t}|z_t) > 0 \\ 0 & \text{otherwise} \end{cases}$$

The function $g(w_t)$ returning a positive value, $n(o_{i,t-1}|z_{t-1})$ corresponding to the occupancy index of the cell i of the occupancy grid $OG_{t-1}$ at the time t−1, and $n(o_{i,t}|z_t)$ corresponding to the occupancy index of the cell i of the occupancy grid $OG_t$ at the time t.

Advantageously, the free inverse model index $n(f_t|w_t)$ is computed as follows:

$$n(f_t|w_t) = \begin{cases} h(w_t) > 0 & \text{if } n(o_{i,t}|z_t) < 0 \\ 0 & \text{otherwise} \end{cases}$$

and $n(o_{i,t}|z_t)$ corresponding to the occupancy index of the cell i of the occupancy grid $OG_t$ at the time t, the function $h(w_t)$ returning a positive value.

Advantageously, the positive value of the function $g(w_t)$ and the positive value of the function $h(w_t)$ are constant values.

Advantageously, the positive value returned by the function $g(w_t)$ is equal to $\max(n(o_{i,t-1}|z_{t-1}), n(o_{i,t}|z_t))$.

Advantageously, the positive value returned by the function $h(w_t)$ is equal to $-n(o_{i,t}|z_t)$.

Advantageously, the free inverse model index $n(f_t|w_t)$ is computed as follows:

$$n(f_t|w_t) = \begin{cases} \max(-n(o_{i,t-1}|z_{t-1}), -n(o_{i,t}|z_t)) & \text{if } n(o_{i,t-1}|z_{t-1}) < 0 \\ -n(o_{i,t}|z_t) \text{ otherwise} \end{cases}$$

Advantageously, the index $n(s_t|w_{1:t-1})$ corresponding to the prediction component of the binary Bayesian filter of the static space grid is obtained using a look-up table comprising a finite set of probability indices, and the filtered index $n(s_t|w_{1:t})$ is obtained by adding integer probability indices, and wherein the index $n(f_t|w_{1:t-1})$ corresponding to the prediction component of the binary Bayesian filter of the free space grid is obtained using a look-up table comprising a finite set of probability indices, and the filtered index $n(f_t|w_{1:t})$ is obtained by adding integer probability indices.

Advantageously, each cell i of the combined grid $(CG_t)$ is computed by way of the following Bayesian fusion:

$$CG_t(i) \triangleq SG_t(i), 1 - FG_t(i)$$

$CG_t(i)$ corresponds to a cell i of the combined grid at the time t, $SG_t(i)$ corresponds to a cell i of the static space grid at the time t, and $FG_t(i)$ corresponds to a cell i of the free space grid at the time t, And according to the value of $CG_t(i)$:

if $CG_t(i)>0$ the cell i is probably static given the sequence of pairs of occupancy grids $(w_{1:t})$ if $CG_t(i)<0$, the cell is probably free, if $CG_t(i)=0$, the cell is neither free nor static.

The invention also relates to a method for avoiding a tangible body moving around a mobile body, characterized in that it implements the abovementioned method to characterize the environment of a mobile device, and in that it sends a command to an actuator of the mobile device in order to avoid said tangible body.

The invention also relates to a device for characterizing the environment of a mobile device, comprising:

at least one input port for receiving a plurality of signals representative of a time series of distance measurements from one or more distance sensors, and a data processor configured to receive said signals at input and to generate a free space grid or a static space grid from said signals by applying the abovementioned method.

BRIEF DESCRIPTION OF THE DRAWINGS

Other features, details and advantages of the invention will become apparent on reading the description provided with reference to the appended drawings, which are given by way of example.

Figure 1:
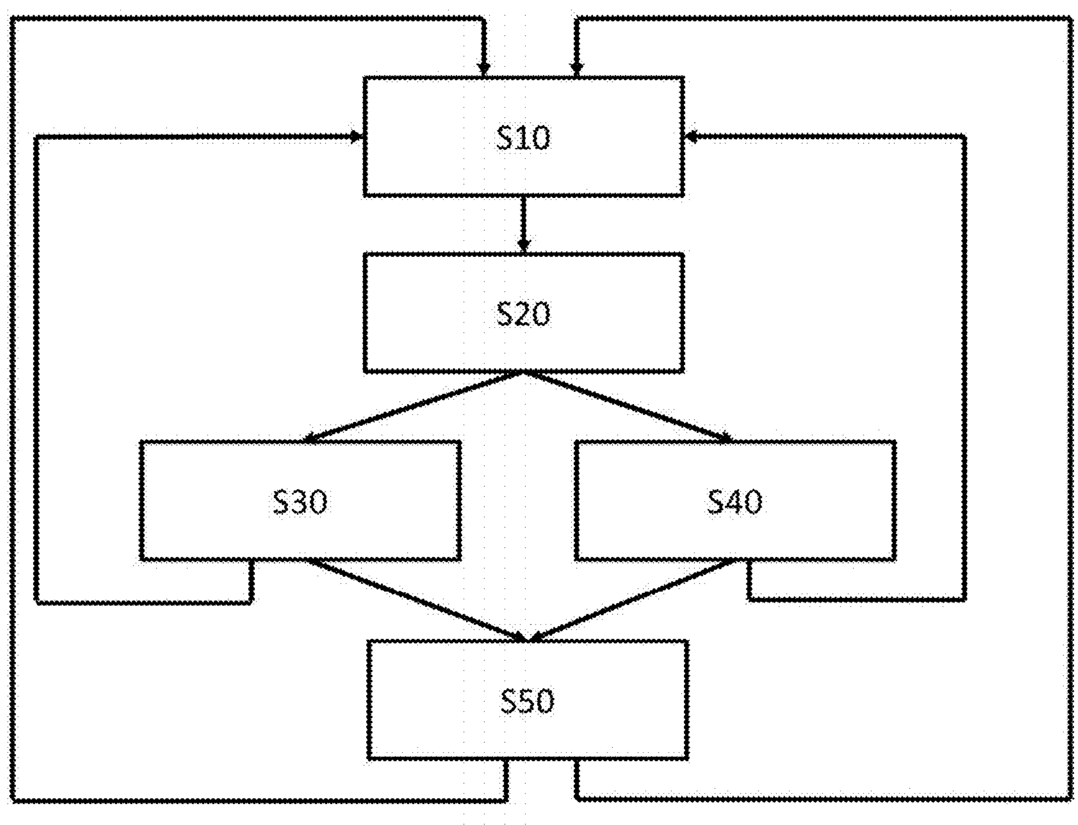
FIG. 1 is a block diagram illustrating the various steps of the method according to the invention.

The various steps of the method according to the invention are illustrated in FIG. 1.

DETAILED DESCRIPTION

The method operates iteratively: in each iteration corresponding to a time t, a new series of measurements is carried out (step S10). Carrying out the same computations with measurements from multiple sensors does not pose any difficulty for a person skilled in the art.

The set of measurements $z_t$ from one or more sensors at the time t makes it possible to determine the probability of occupancy of a cell i from among the $N_c$ cells of an occupancy grid as described above. Each cell is thus identified by an index i ranging from 1 to $N_c$.

The reference $z_t$ actually denotes a set of measurements when the system consists of multiple sensors or when a sensor produces multiple measurements in each iteration. For example, a lidar scan produces a point cloud consisting of a finite number of points.

Generation of the Pair of Occupancy Grids

The second step S20 consists in generating a pair $w_t$ of occupancy grids. At each time t, an occupancy grid $OG_t$ fuses the measurements produced by all of the sensors of the system in the same iteration.

It will be recalled that, for an occupancy grid $OG_t$, a cell has a binary state: it is or is not occupied by an obstacle. In the context of occupancy grids, it is commonly assumed that "not occupied" means "free".

At each time t, the probability of a cell being occupied is thus calculated taking into account all of the sensor measurements produced at the same time t. $P(o_{i,t}|z_t)$ represents the probability of occupancy of a cell i given the measurements $z_t$.

A new occupancy grid $OG_t$ is thus generated at the time t, and the occupancy grid $OG_{t-1}$, generated at the time t−1, is stored in memory in order to be reused for the pair $w_t$ of occupancy grids. $w_{1:t}$ denotes the sequence $(w_1, \ldots, w_t)$ in the present application.

Generation of the Static Space Grid

In a third step S30, a static space grid $SG_t$ is generated at the time t. The static space grid $SG_t$ is an array of $N_c$ elements, in which:

$$\forall i \in \{1, \ldots, N_c\}, SG_t(i) = P(s_t|w_{1:t})$$

Each cell $SG_t(i)$ of the static space grid has a subsequent probability, at the time t, of the cell being occupied by a static tangible body $P(s_t|w_{1:t})$ given the sequence of pairs of occupancy grids $w_{1:t}$.

Figure 2:
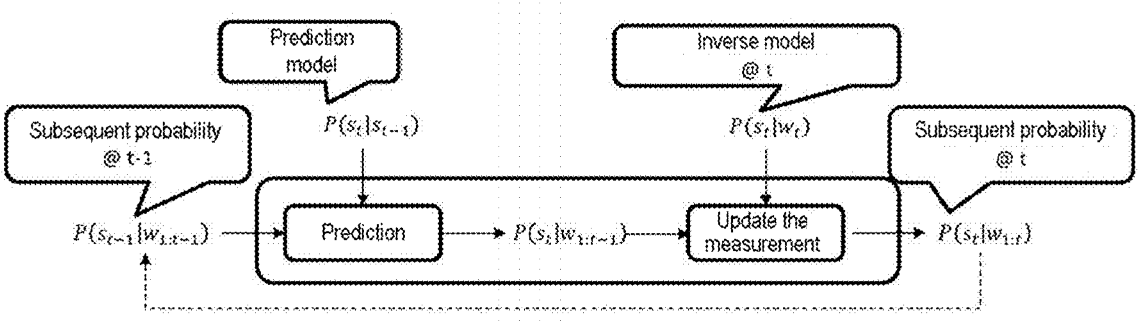
FIG. 2 is a diagram illustrating the binary Bayesian filter.

Said subsequent probability $P(s_t|w_{1:t})$ is computed for each cell of the static space grid $SG_t$ by way of a binary Bayesian filter, the principle of which is recalled in FIG. 2.

Binary Bayesian filtering consists in recursively estimating a hidden state (this being the case if certain cells are obstructed by an obstacle, meaning that the distance measurement is unknown) in the light of observations.

$P(s_t|z_{1:t})$ is called subsequent probability, since it depends on the specific value of the observations $z_{1:t}$. As illustrated in FIG. 2, the subsequent probability is reinjected at input of the filter for the following iteration.

The binary Bayesian filter essentially comprises two steps, namely a prediction step, which depends on the state of the pairs at the previous times 1: t−1 (subsequent probability at the time t−1, and prediction model at the time t) and a step of updating the measurement, which takes into account the inverse model at the time t and the output of the prediction.

Advantageously, it may be considered that the static prediction model (probability of the cell being occupied by a static tangible body at the time t as a function of the state of the cell at the time t−1) is equal to a constant value α.

With this hypothesis, the prediction equation may be written:

$$P(s_t|w_{1:t-1}) = P(s_{t-1}|w_{1:t-1})\cdot\alpha + (1 - P(s_{t-1}|w_{1:t-1}))\cdot(1-\alpha)$$

Thus, the value of α influences the prediction as follows:

If α=1, the result of the prediction is $P(s_t|w_{1:t-1}) = P(s_{t-1}|w_{1:t-1})$, this meaning that $s_t$ keeps the same value as the previous estimate of $s_{t-1}$.

If $$\alpha = \frac{1}{2},$$

the result of the prediction is $$P(s_t \mid w_{1:t-1}) = \frac{1}{2},$$

this meaning that the prediction of $s_t$ from $s_{t-1}$ results from a completely uncertain estimate of $s_t$.

A value of α between ½ and 1 expresses the degree of uncertainty between the previous scenarios.

In the context of the present invention, the inverse model at the time t is what is referred to as a static inverse model $P(s_t|w_t)$ that comprises a probability of knowing that the cell is occupied by a tangible body at the time t−1 and at the time t from the pair of occupancy grids at the time t−1 and at the time t. A person skilled in the art may refer to the detailed definition of the inverse model in patent application FR3041451.

At each time t, the static inverse model is computed from the pair $w_t$ of occupancy grids. Using a binary Bayesian filter with an inverse model comprising the last two occupancy grids (at the time t−1 and at the time t) thus makes it possible to determine, for each cell, whether it is occupied by a static tangible body. This modus operandi differs from the method disclosed in patent application FR3116640, which estimates the movement of a tangible body using an inverse model that depends only on a single series of temporal observations at a time t. In patent application FR3116640, movement is estimated using an inconsistency grid that is generated in response to detection, between two iterations, of a change of occupancy state in the feature grids.

As illustrated in FIG. 2, the subsequent probability $P(s_{t-1}|w_{1:t-1})$ of the cell being occupied by a static tangible body at the time t−1 is injected directly at input of the binary Bayesian filter, thereby considerably simplifying the method disclosed in patent application FR3116640. Indeed, in that document, the iterative method for estimating the movement of a tangible body implements a step of propagating the probability indices before they are reinjected at input of the filter.

The method according to the invention thus makes it possible to characterize the cells occupied by static obstacles, in the environment of a mobile device, with lower computational complexity compared to known methods.

Generation of the Free Space Grid

In a step S40, the same principle may be applied to generate a free space grid $FG_t$ at the time t.

Each cell $FG_t(i)$ of the free space grid at the time t thus has a subsequent probability $P(f_t|w_{1:t})$) of the cell being free at the time t. The subsequent probability is computed for each cell by way of a binary Bayesian filter from:

- the subsequent probability of said cell being free at the time −1 ($P(f_{t-1}|w_{1:t-1})$), said subsequent probability of said cell being free at the time t−1 ($P(f_{t-1}|w_{1:t-1})$) being injected directly at input of the binary Bayesian filter;
- what is referred to as a free prediction model comprising a probability of the cell being free at the time t as a function of the state of the cell at the time t−1 ($P(f_t|f_{t-1})$); and
- what is referred to as a static inverse model at the time t ($P(f_t|w_t)$) that comprises a probability of knowing that the cell is free at the time t−1 and at the time t from the pair of occupancy grids at the time t−1 and at the time t.

The method according to the invention thus makes it possible to characterize the free cells, in the environment of a mobile device, also with lower computational complexity compared to known methods.

According to one embodiment, the method according to the invention comprises only generating a static space grid (that is to say without generating a free space grid) or, conversely, only generating a free space grid (that is to say without generating a static space grid). Indeed, the two grids are independent, and the method may iterate the steps S10-S20-S30 or the steps S10-S20-S40 in a loop.

Generation of the Combined Grid

As a variant, the static space grid and the free space grid are implemented concomitantly. Thus, in each iteration, a static space grid $SG_t$ and a free space grid $FG_t$ are generated, from the same distance measurements, with the same pairs $w_t$ of occupancy grids.

Advantageously, in each iteration, the static space grid $SG_t$ and the free space grid $FG_t$ are combined with one another (cell-by-cell combination), so as to obtain a combined grid $CG_t$ (step S50, FIG. 1).

Each cell i of the combined grid $CG_t$ may be computed by way of the following Bayesian fusion:

$$CG_t(i) \triangleq F(SG_t(i), 1 - FG_t(i))$$

F (,) represents the Bayesian fusion function.

Thus, according to the sign of $CG_t(i)$:

if $CG_t(i)>1/2$, the cell i is probably static given the sequence of pairs of occupancy grids $w_{1:t}$ if $CG_t(i)<1/2$, the cell is probably free, if $CG_t(i)=1/2$, the cell is neither free nor static.

The estimate that "prevails" between the estimate of the static space grid $SG_t$ and the estimate of the free space grid $FG_t$ is thus looked at.

Figure 3:
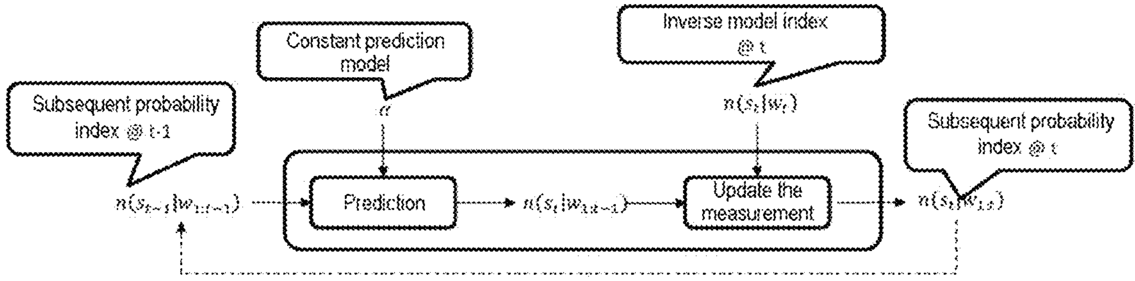
FIG. 3 is a diagram illustrating the integer binary Bayesian filter.
Figure 4:
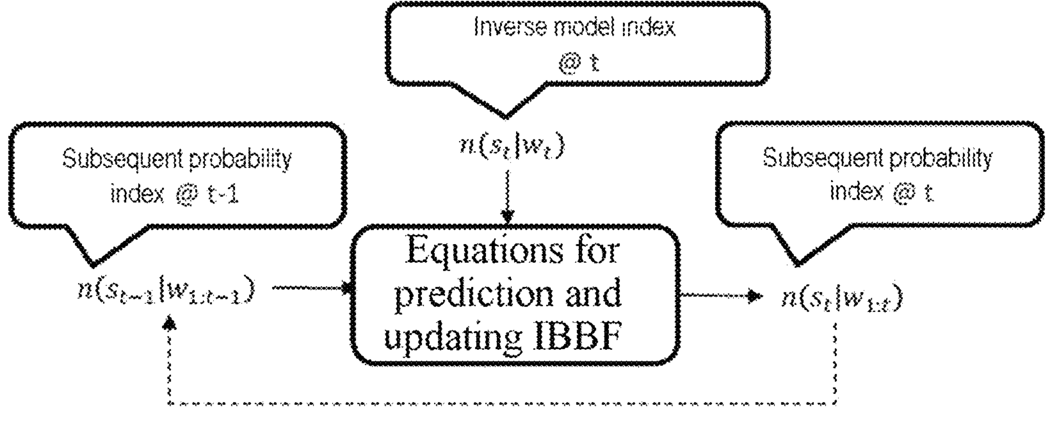
FIG. 4 is a diagram illustrating the integer binary Bayesian filter, wherein the prediction model is constant.

The method thus described uses the model of the binary Bayesian filter. One way to improve the implementation and the integration of the method in a microprocessor would be to apply an integer binary Bayesian filter, as illustrated in FIG. 3. The case where the static prediction model is equal to a constant value α is illustrated by FIG. 4.

For this purpose, the subsequent probability $P(s_t|w_{1:t})$ of the cell being occupied by a static tangible body at the time t is identified by a probability index $n(s_t|w_{1:t})$. The subsequent probability $P(s_{t-1}|w_{1:t-1})$ of the cell being occupied by a static tangible body at the time t−1 is identified by a probability index $n(s_{t-1}|w_{1:t-1})$. Similarly, the static inverse model $P(s_t|w_t)$ at the time t is identified by a static inverse model index $n(s_t|w_t)$. Moreover, it is considered that the static prediction model has a constant value α over time.

These indices belong to a set of finite cardinality of probability classes, and the prediction and update steps benefit from the integer fusion function for the filtering function, using only integer arithmetic, as described in patent application FR3116640. Indeed, the set of finite cardinality of probability classes is formed by combining one or more subsets such that, in the step of updating the measurement, fusion of two probability classes belonging to one and the same subset provides a result also belonging to said subset.

The index $n(s_t|w_{1:t-1})$ corresponding to the prediction component of the integer binary Bayesian filter of the static space grid is obtained using a look-up table comprising a finite set of probability indices, and the filtered index $n(s_t|w_{1:t})$ is obtained by adding integer probability indices.

Algorithm of the Integer Binary Bayesian Filter of the Static Space Grid $SG_t$.

The integer binary Bayesian filter $IBBF_{SG}$ of the static space grid $SG_t$ is an algorithm comprising an initialization function for the filter, and an iterative application function for the filter, with direct feedback from the output of the filter. The prediction step, in the initialization function for the filter, is computed using a look-up table, and the measurement update is computed using a sum of integer indices, as indicated below.

The initialization function depends on the following input parameters: $\epsilon_{GFSE}$, $\Gamma_{GFSE}$ and $\alpha_{SG}$ $\epsilon_{GFSE}$ is a constant that corresponds to the approximation parameter of the sequence $(q_n)_{n\in\Gamma_{GFSE}}$ of real numbers between 0 and 1 used in the integer Bayesian fusion function, whose parameters x and y are probability values, and defined as:

$$F(x, y) = \frac{x \cdot y}{x \cdot y + (1 - x) \cdot (1 - y)}$$

-continued $$(q_n)_{n\in\mathbb{Z}} = \begin{cases} \frac{1}{2} & \text{if } n = 0 \\ \frac{1}{2} + \epsilon_{GFSE} & \text{if } n = 1 \\ \frac{1}{2} - \epsilon_{GFSE} & \text{if } n = -1 \\ F(q_{n-1}, q_1) & \text{if } n > 1 \\ F(q_{n-1}, q_{-1}) & \text{if } n < -1 \end{cases}$$

The set of indices $\Gamma_{GFSE}$ is a subset of $\mathbb{Z}$ for defining the sequence $(q_n)_{n\in\Gamma_{GFSE}}$. Thus, rather than working on an infinite sequence $(q_n)_{n\in\mathbb{Z}}$, work is carried out only in a finite sequence $(q_n)_{n\in\Gamma_{GFSE}}$. For example, to decode the indices n in 8 bits only, $\Gamma_{GFSE}=\{-128, \ldots, 127\}$ is adopted.

$\alpha_{SG}$ is a constant for the initialization function, with $1/2\le\alpha_{SG}\le 1$, and that corresponds to the numerical value of the static prediction model $P(s_t|s_{t-1})$.

The first step of the initialization function consists in determining each entry in the look-up table predLUT starting with an empty vector of size $\Gamma_{GFSE}$, and then, for each n in $\Gamma_{GFSE}$, the element predLUT(n) is a probability index computed as follows:

$$predLUT(n) = m \text{ where } approx_{policy}(q_n \cdot \alpha_{SG} + (1 - q_n) \cdot (1 - \alpha_{SG})) = q_m.$$

The function approx_policy approximates the result of the operation $(q_n\cdot\alpha_{SG}+(1-q_n)\cdot(1-\alpha_{SG}))$ by an element $q_m$ of the sequence $(q_n)_{n\in\Gamma_{GFSE}}$. It is the index m of $q_m$ that is stored in the element predLUT(n) of the look-up table predLUT.

The application function for the integer binary Bayesian filter $IBBF_{SG}$ ApplyFilter($n(s_{t-1}|w_{1:t-1})$, $n(s_t|w_t)$) is defined as follows:

Prediction: $n(s_t|w_{1:t-1})\leftarrow predLUT(n(s_{t-1}|w_{1:t-1}))$

Measurement update: $n(s_t|w_{1:t})\leftarrow n(s_t|w_{1:t-1})+n(s_t|w_t)$

Figure 5:
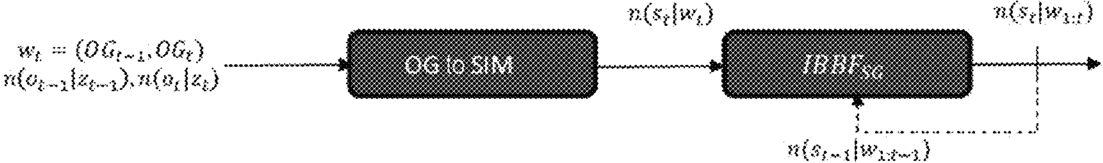
FIG. 5 is a diagram illustrating the method for characterizing the environment according to the invention by generating a static space grid.

The method according to the invention advantageously computes the static inverse model index $n(s_t|w_t)$ as follows, illustrated by FIG. 5 (block "OG to SIM"):

$$n(s_t|w_t) = \begin{cases} g(w_t) > 0 & \text{if } n(o_{i,t-1}|z_{t-1}) > 0 \text{ and } n(o_{i,t}|z_t) > 0 \\ 0 & \text{otherwise} \end{cases}$$

If the cell is probably occupied both at the time t−1 and at the time t, the value of the index of the static inverse model is defined by the function $g(w_t)$ that returns a positive index. Otherwise, the value of the index of the static inverse model is equal to zero.

$n(o_{i,t}|z_t)$ corresponds to the probability index in the occupancy grid of the cell i: OG (i)=$n(o_{i,t}|z_t)$ According to one embodiment, the function $g(w_t)$ returns a constant value $\beta_{SG}>0$.

As a variant, it is possible to define $g(n(w_t))=\max(n(o_{i,t-1}|z_{t-1}), n(o_{i,t}|z_t))$.

Algorithm of the Integer Binary Bayesian Filter of the Free Space Grid $FG_t$

The integer binary Bayesian filter $IBBF_{FG}$ of the free space grid $FG_t$ is based on the same principle as the integer binary Bayesian filter $IBBF_{SG}$ of the static space grid $SG_t$.

The subsequent probability of the cell being free at the time t ($P(f_t|w_{1:t})$) is identified respectively by a probability index $n(f_t|w_{1:t})$ and the free inverse model at the time t ($P(f_t|w_t)$) is identified by a free inverse model index $n(f_t|w_t)$.

Figure 6:
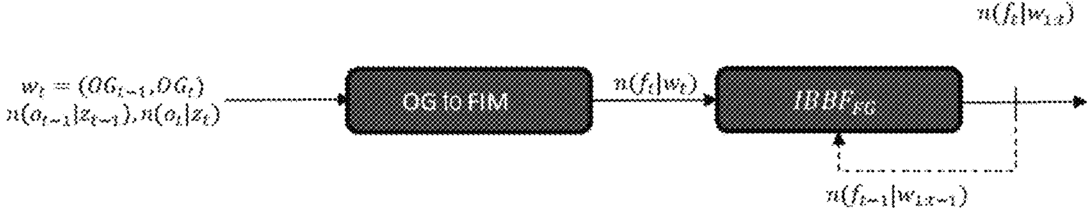
FIG. 6 is a diagram illustrating the method for characterizing the environment according to the invention by generating a free space grid.

As illustrated in FIG. 6, the integer binary Bayesian filter $IBBF_{FG}$ of the free space grid $FG_t$ computes the probability index $n(f_t|w_{1:t})$ iteratively, based on the probability index $n(f_{t-1}|w_{1:t-1})$.

The initialization function for the filter depends on the following input parameters: $\in_{GFSE}$, $\Gamma_{GFSE}$ and $\alpha_{FG}$ The constant $\in_{GFSE}$ and the set of indices $\Gamma_{GFSE}$ are identical to those used for the integer binary Bayesian filter $IBBF_{SG}$ of the static space grid $SG_t$.

$\alpha_{FG}$ is a constant, with $$\frac{1}{2} \leq \alpha_{FG} \leq 1,$$

and that corresponds to the numerical value of the free prediction model $P(f_t|f_{t-1})$.

The details of the computations explained above for the integer binary Bayesian filter $IBBF_{SG}$ of the static space grid $SG_t$ apply, in the same way, to the integer binary Bayesian filter $IBBF^{FG}$ of the free space grid $FG_t$; they are therefore not repeated here.

The inputs of the application function for the filter $IBBF^{FG}$ are the probability index $n(f_{t-1}|w_{1:t-1})$ that is computed recursively, with direct feedback from the output of the filter, and the free inverse model index $n(f_t|w_t)$.

Advantageously, the free inverse model index $n(f_t|w_t)$ is computed as follows (block "OG to FIM", FIG. 6):

If the cell is probably free at the time t based on the occupancy grid at the time ($OG_t$), the value of the free inverse model index is determined by way of the function $h(w_t)$ that returns a positive value. The index of the free inverse model is equal to zero in the other cases, that is to say:

$$n(f_t|w_t) = \begin{cases} h(w_t) > 0 & \text{if } n(o_{i,t}|z_t) < 0 \\ 0 & \text{otherwise} \end{cases}$$

$n(o_{i,t}|z_t)$ corresponds to the probability index in the occupancy grid of the cell i: $OG_t(i)=n(o_{i,t}|z_t)$ According to one embodiment, the function $h(w_t)$ returns a constant value $\beta_{FG}>0$.

As a variant, it is possible to define $h(w_t)=-n(o_{i,t}|z_t)$

Or else, according to another variant:

$$n(f_t|w_t) = \begin{cases} \max(-n(o_{i,t-1}|z_{t-1}), -n(o_{i,t}|z_t)) & \text{if } n(o_{i,t-1}|z_{t-1}) < 0 \\ -n(o_{i,t}|z_t) & \text{otherwise} \end{cases}$$

Figure 7:
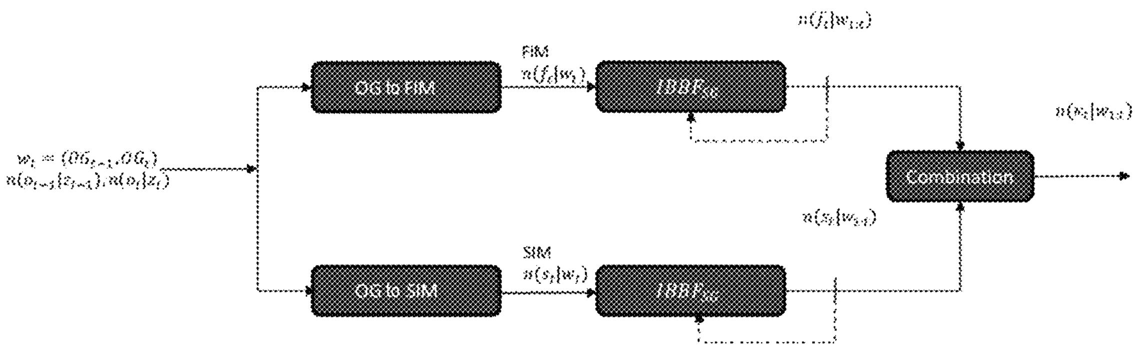
FIG. 7 is a diagram illustrating the method for characterizing the environment according to the invention by generating a combined grid.

The generation of a combined grid resulting from the combination of the static space grid $SG_t$ and of the free space grid $FG_t$ may be implemented using the integer binary Bayesian filters, as illustrated in FIG. 7, the combination in this case taking place between the probability indices $n(s_t|w_{1:t})$ and $n(f_t|w_{1:t})$, so as to obtain an index $n(\kappa_t|w_{1:t})$ for each cell of the combined grid.

In this case, using the integer binary Bayesian filters, each cell i of the combined grid $CG_t$ may be calculated by the following Bayesian fusion:

$$CG_t(i) \triangleq SG_t(i) - FG_t(i)$$

Thus, according to the sign of $CG_t(i)$:

if $CG_t(i)>0$, the cell i is probably static given the sequence of pairs of occupancy grids $w_{1:t}$ if $CG_t(i)<0$, the cell is probably free, if $CG_t(i)=0$, the cell is neither free nor static.

The estimate that "prevails" between the estimate of the static space grid $SG_t$ and the estimate of the free space grid $FG_t$ is thus looked at.

As a variant, it is possible to apply a maximum value criterion. Each cell i of the combined grid $CG_t$ may thus be computed as follows:

$$CG_t(i) \triangleq \begin{cases} -FG_t(i) & \text{if } FG_t(i) > SG_t(i) \\ 0 & \text{if } FG_t(i) = SG_t(i) \\ SG_t(i) & \text{in other cases} \end{cases}$$

By virtue of using integer binary Bayesian filters, the movement estimate may be carried out in microprocessors, for example with ARM (registered trademark) architectures, whereas in the prior art the estimate is very intensive in terms of computing resources, and usually requires graphics processing units (GPUs).

Figure 8:
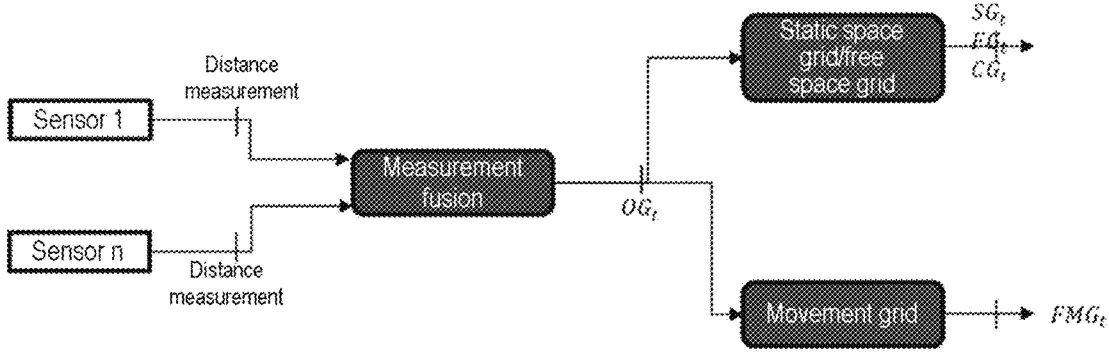
FIG. 8 is a diagram illustrating the way in which the method according to the invention differs from an algorithm for estimating the displacement of a tangible body known to a person skilled in the art.

FIG. 8 illustrates the complementarity between the method according to the invention and that described in patent application FR3116640. A plurality of sensors (sensor 1, . . . , sensor n). The measurements are fused by implementing the method as described in patent application FR3041451, thereby making it possible to obtain occupancy grids OG (a probability of occupancy per cell). The occupancy grids may be used either to generate the static space and free space grids according to the present invention, or to generate the movement grid described in patent application FR3116640. Nevertheless, the computations to arrive at the movement grid are fundamentally different from those used to arrive at the static space and free space grids, as indicated above.

The method according to the invention may be implemented by at least one distance sensor, for example a lidar, a radar or even a sonar, or by a camera able to extract distance information from a scene acquired by the sensor.

The feature grids are established from the distance measurements carried out by the sensor.

The sensor may be housed on board a mobile device, such as a vehicle, in particular an autonomous vehicle, or else a non-autonomous vehicle, and in this case the method according to the invention makes it possible to assist the driver in detecting obstacles.

The mobile device may also be any device able to move autonomously, for example a household appliance such as an autonomous vacuum cleaner, or else a gardening appliance such as an autonomous lawnmower.

The mobile device moreover comprises actuators able to correct the trajectory of the autonomous mobile device on the basis of the characterization of the environment of a mobile device that has been carried out by way of the method according to the invention.

The invention has essentially been described by discretizing the set of probabilities into a set of finite cardinality, so as not to have to carry out computations using floating-point arithmetic. This provision makes it possible in particular to implement the method according to the invention in an embedded system having severe integration constraints.

The method according to the invention could also use floating-point arithmetic, in particular if the computational capabilities of the device implementing the method make it possible to carry out the characterization of the environment in real time.

The invention claimed is:

1. A method for characterizing the environment of a mobile device, wherein, for each iteration at a time t, the following steps are implemented:

S10) Acquiring a plurality of distance measurements ($z_t$) in the environment by way of at least one sensor;

S20) Generating a pair ($w_t$) of occupancy grids at the time t−1($OG_{t-1}$) and at the time t($OG_t$), each grid ($OG_{t-1}$, $OG_t$) fusing the distance measurements into a discretized spatial representation of the environment;

S30) Generating a static space grid at the time ($SG_t$), each cell ($SG_t(i)$) of the static space grid at the time t having a subsequent probability of said cell being occupied by a static tangible body at the time t ($P(s_t|w_{1:t})$), said subsequent probability $P(s_t|w_{1:t})$ being computed for each cell ($SG_t(i)$ by way of a binary Bayesian filter from:

the subsequent probability of said cell being occupied by a static tangible body at the time −1 ($P(s_{t-1}|w_{1:t-1})$), said subsequent probability of said cell being occupied by a static tangible body at the time t−1 ($P(s_{t-1}|w_{1:t-1})$) being injected directly at input of the binary Bayesian filter;

what is referred to as a static prediction model corresponding to a probability of the cell being occupied by a static tangible body at the time t as a function of the state of the cell at the time t−1 ($P(s_t|s_{t-1})$); and what is referred to as a static inverse model at the time t($P(s_t|w_t)$) corresponding to a probability of knowing that the cell is occupied by a static tangible body at the time t from the pair of occupancy grids at the time t−1 and at the time t;

and/or

S40) Generating a free space grid at the time t ($FG_t$), each cell ($FG_t(i)$) of the free space grid at the time t having a subsequent probability of said cell being free at the time t $P(f_t|w_{1:t})$), said subsequent probability being computed for each cell by way of a binary Bayesian filter from:

the subsequent probability of said cell being free at the time t−1 ($P(f_{t-1}|w_{1:t-1})$), said subsequent probability of said cell being free at the time t−1 ($P(f_{t-1}|w_{1:t-1})$) being injected directly at input of the binary Bayesian filter;

what is referred to as a free prediction model corresponding to a probability of the cell being free at the time t as a function of the state of the cell at the time t−1 ($P(f_t|f_{t-1})$); and what is referred to as a free inverse model at the time t ($P(f_t(w_t)$) corresponding to a probability of knowing that the cell is free at the time t from the pair of occupancy grids at the time t−1 and at the time t.

2. The method according to claim 1, wherein step S30) of generating a static space grid and step S40) of generating a free space grid are implemented concomitantly.

3. The method according to claim 2, comprising a step S50) of generating a combined grid ($CG_t$) resulting from the combination of the static space grid ($SG_t$) and the free space grid ($FG_t$).

4. The method according to claim 3, wherein each cell i of the combined grid ($CG_t$) is computed by way of the following Bayesian fusion:

$$CG_t(i) \triangleq F(SG_t(i), 1 - FG_t(i))$$

wherein F(,) is the Bayesian fusion function, $CG_t(i)$ corresponds to a cell i of the combined grid at the time t, $SG_t(i)$ corresponds to a cell i of the static space grid at the time t, and $FG_t(i)$ corresponds to a cell i of the free space grid at the time t, And according to the value of $CG_t(i)$:

if $CG_t(i) > 1/2$, the cell i is probably static given the sequence of pairs of occupancy grids ($w_{1:t}$)

if $CG_t(i) < 1/2$, the cell is probably free, if $CG_t(i) = 1/2$, the cell is neither free nor static.

5. The method according to claim 1, wherein:

the subsequent probability of the cell being occupied by a static tangible body at the time t ($P(s_t|w_{1:t})$) and the static inverse model at the time t ($P(s_t|w_t)$) are approximated by values belonging to a set of finite cardinality, the values being identified respectively by a probability index $n(s_t|w_{1:t})$ and by a static inverse model index $n(s_t|w_t)$;

the subsequent probability of the cell being free at the time t ($P(f_t|w_{1:t})$) and the free inverse model at the time t ($P(f_t|w_t)$) are approximated by values belonging to a set of finite cardinality, the values being identified respectively by a probability index $n(f_t|w_{1:t})$ and by a free inverse model index $n(f_t|w_t)$.

6. The method according to claim 5, wherein the static inverse model index $n(s_t|w_t)$ is computed as follows:

$$n(s_t|w_t) = \begin{cases} g(w_t) > 0 & \text{if } n(o_{i,t-1}|z_{t-1}) > 0 \text{ and } n(o_{i,t}|z_t) > 0 \\ 0 & \text{otherwise} \end{cases}$$

the function $g(w_t)$ returning a positive value, $n(o_{i,t-1}|z_{t-1})$ corresponding to the occupancy index of the cell i of the occupancy grid $OG_{t-1}$ at the time t−1, and $n(o_{i,t}|z_t)$ corresponding to the occupancy index of the cell i of the occupancy grid $OG_t$ at the time t.

7. The method according to claim 5, wherein the free inverse model index $n(f_t|w_t)$ is computed as follows:

$$n(f_t|w_t) = \begin{cases} h(w_t) > 0 & \text{if } n(o_{i,t}|z_t) < 0 \\ 0 & \text{otherwise} \end{cases}$$

and $n(o_{i,t}|z_t)$ corresponding to the occupancy index of the cell i of the occupancy grid $OG_t$ at the time t, the function $h(w_t)$ returning a positive value.

8. The method according to claim 6, wherein the positive value of the function $g(w_t)$ and the positive value of the function $h(w_t)$ are constant values ($\beta_{SG}$, $\beta_{FG}$).

9. The method according to claim 6, wherein the positive value returned by the function $g(w_t)$ is equal to $\max(n(o_{i,t-1}|z_{t-1}), n(o_{i,t}|z_t)$.

10. The method according to claim 7, wherein the positive value returned by the function $h(w_t)$ is equal to $-n(o_{i,t}|z_t)$.

11. The method according to claim 5, wherein the free inverse model index $n(f_t|w_t)$ is computed as follows:

$$n(f_t|w_t) = \begin{cases} \max(-n(o_{i,t-1}|z_{t-1}), -n(o_{i,t}|z_t)) & \text{if } n(o_{i,t-1}|z_{t-1}) < 0 \\ -n(o_{i,t}|z_t) & \text{otherwise} \end{cases}$$

$n(o_{i,t}|z_t)$ corresponding to the occupancy index of the cell i of the occupancy grid $OG_t$ at the time t, and $n(o_{i,t-1}|z_{t-1})$ corresponding to the occupancy index of the cell i of the occupancy grid $OG_{t-1}$ at the time t−1.

12. The method according to claim 5, wherein step S30) of generating a static space grid and step S40) of generating a free space grid are implemented concomitantly, and comprising a step S50) of generating a combined grid (CG_t) resulting from the combination of the static space grid (SG_t) and the free space grid (FG_t), wherein the index $n(s_t|w_{1:t-1})$ corresponding to the prediction component of the binary Bayesian filter of the static space grid is obtained using a look-up table comprising a finite set of probability indices, and the filtered index $n(s_t|w_{1:t})$ is obtained by adding integer probability indices, and wherein the index $n(f_t|w_{1:t-1})$ corresponding to the prediction component of the binary Bayesian filter of the free space grid is obtained using a look-up table comprising a finite set of probability indices, and the filtered index $n(f_t|w_{1:t})$ is obtained by adding integer probability indices.

13. The method according to claim 5, wherein each cell i of the combined grid ($CG_t$) is computed by way of the following Bayesian fusion:

$$CG_t(i) \triangleq SG_t(i), 1 - FG_t(i)$$

$CG_t(i)$ corresponds to a cell i of the combined grid at the time t, $SG_t(i)$ corresponds to a cell i of the static space grid at the time t, and $FG_t(i)$ corresponds to a cell i of the free space grid at the time t, and according to the value of $CG_t(i)$:

if $CG_t(i)>0$ the cell i is probably static given the sequence of pairs of occupancy grids ($w_{1:t}$)

if $CG_t(i)<0$, the cell is probably free, if $CG_t(i)=0$, the cell is neither free nor static.

14. The method for avoiding a tangible body moving around a mobile device, implementing the method according to claim 1 to characterize the environment of a mobile device, and in that it sends a command to an actuator of the mobile device in order to avoid said tangible body.

15. A device for characterizing the environment of a mobile device, the characterization device comprising:

at least one input port for receiving a plurality of signals representative of a time series of distance measurements from one or more distance sensors, and a data processor configured to receive said signals at input and to generate a free space grid or a static space grid from said signals by applying a method according to claim 1.

* * * * *